(12) United States Patent
Nakamura et al.

(10) Patent No.: US 9,969,281 B2
(45) Date of Patent: May 15, 2018

(54) VEHICLE AND POWER TRANSFER SYSTEM

(75) Inventors: Toru Nakamura, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 14/357,695

(22) PCT Filed: Nov. 22, 2011

(86) PCT No.: PCT/JP2011/076860
§ 371 (c)(1),
(2), (4) Date: May 12, 2014

(87) PCT Pub. No.: WO2013/076804
PCT Pub. Date: May 30, 2013

(65) Prior Publication Data
US 2014/0320078 A1 Oct. 30, 2014

(51) Int. Cl.
*H02J 7/00* (2006.01)
*H02J 7/14* (2006.01)
*B60L 11/18* (2006.01)
*B60L 11/12* (2006.01)
*B60L 11/14* (2006.01)
(Continued)

(52) U.S. Cl.
CPC ........... *B60L 11/182* (2013.01); *B60L 11/123* (2013.01); *B60L 11/14* (2013.01); *B60L 11/1818* (2013.01); *B60L 11/1833* (2013.01); *B60L 11/1877* (2013.01); *B60L 11/1879* (2013.01); *B60K 1/00* (2013.01); *B60K 1/04* (2013.01); *B60K 2001/0416* (2013.01); *B60L 2210/10* (2013.01); *B60L 2210/30* (2013.01); *B60Y 2200/92* (2013.01); *Y02T 10/6217* (2013.01); *Y02T 10/7005* (2013.01); *Y02T 10/705* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
USPC .............. 320/108, 109, 107, 104, 137, 134; 307/104, 10.1
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Alexis Pacheco
(74) *Attorney, Agent, or Firm* — Oliff PLC

(57) ABSTRACT

The vehicle includes a floor panel, a power reception device configured to receive power in a non-contact manner from a power transmission device disposed in the external, and a battery connected to the power reception device. The battery is disposed above the floor panel. The power reception device is disposed below the floor panel. The power reception device and the battery are disposed to overlap each other at least partially in planar view.

11 Claims, 10 Drawing Sheets

(51) Int. Cl.
*B60K 1/04* (2006.01)
*B60K 1/00* (2006.01)

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0043931 A1* | 2/2012 | Terao .................... H02J 7/025 320/108 |
| 2012/0068663 A1* | 3/2012 | Tanikawa ............ B60L 11/1816 320/109 |
| 2013/0026850 A1 | 1/2013 | Throngnumchai et al. |
| 2013/0037365 A1 | 2/2013 | Ichikawa |
| 2013/0057207 A1* | 3/2013 | Ichikawa ............... B60K 6/445 320/108 |
| 2014/0167691 A1* | 6/2014 | Kamaga ............. B60L 11/1838 320/109 |
| 2014/0217972 A1* | 8/2014 | Ishii ......................... B60L 3/00 320/109 |
| 2014/0343776 A1* | 11/2014 | Ang .................. H01M 10/4257 701/22 |

FOREIGN PATENT DOCUMENTS

| | | | | |
|---|---|---|---|---|
| AU | 2007349874 A2 | 10/2008 | | |
| AU | 2010200044 A1 | 1/2010 | | |
| CA | 2 615 123 A1 | 1/2007 | | |
| CA | 2 682 284 A1 | 10/2008 | | |
| CN | 101258658 A | 9/2008 | | |
| CN | 101682216 A | 3/2010 | | |
| CN | 101860089 A | 10/2010 | | |
| EP | 1 902 505 A2 | 3/2008 | | |
| EP | 2 130 287 A1 | 12/2009 | | |
| EP | 2747245 A1 * | 6/2014 | ............. H01F 38/14 | |
| EP | 2773019 A4 * | 11/2015 | ............. H02J 5/005 | |
| IN | 735/DELNP/2008 | 5/2008 | | |
| IN | 6195/DELNP/2009 | 7/2010 | | |
| JP | A-6-86470 | 3/1994 | | |
| JP | H06-284512 A | 10/1994 | | |
| JP | A-2003-274569 | 9/2003 | | |
| JP | A-2008-253131 | 10/2008 | | |
| JP | A-2009-501510 | 1/2009 | | |
| JP | A-2010-130800 | 6/2010 | | |
| JP | A-2011-193671 | 9/2011 | | |
| JP | A-2011-229360 | 11/2011 | | |
| KR | 2008-0031398 A | 4/2008 | | |
| KR | 2010-0015954 A | 2/2010 | | |
| WO | WO 2007/008646 A2 | 1/2007 | | |
| WO | WO 2008/118178 A1 | 10/2008 | | |
| WO | 2010/131348 A1 | 11/2010 | | |
| WO | 2011/114208 A2 | 9/2011 | | |

* cited by examiner

VEHICLE AND POWER TRANSFER SYSTEM

TECHNICAL FIELD

The present invention relates to a vehicle and a power transfer system.

BACKGROUND ART

In recent years, due to environmental considerations, hybrid vehicles, electric vehicles and the like in which drive wheels are driven by using power from a battery or the like gaining attention.

Particularly in recent years, in an electrically powered vehicle mounted with the battery mentioned above, wireless charging which allows the battery to be charged in a non-contact manner without using a plug or the like is gaining attention. Recently, various charge approaches have been proposed for non-contact charging.

For example, Japanese Patent Laying-Open No. 2008-253131 (PTD 1) discloses a power transfer system which utilizes non-contact charging.

In the power transfer system, a power reception device including a power reception unit is mounted in a vehicle. In mounting a power reception device in the vehicle practically, the power reception device is needed to be mounted in a limited space of the vehicle. Thus, it is necessary to consider the positional relationship between the power reception device and the other parts mounted in the vehicle.

CITATION LIST

Patent Document

PTD 1: Japanese Patent Laying-Open No. 2008-253131

SUMMARY OF INVENTION

Technical Problem

Accordingly, the present invention has been accomplished in view of the aforementioned problems, and it is therefore an object of the present invention to provide a vehicle and a power transfer system having a structure which allows a power reception device to be efficiently mounted in a limited space of the vehicle.

Solution to Problem

A vehicle according to the present invention includes a floor panel, a power reception device configured to receive power in a non-contact manner from a power transmission device disposed in the external, and a battery connected to the power reception device. The battery is disposed above the floor panel, the power reception device is disposed below the floor panel, and the power reception device and the battery are disposed to overlap each other at least partially in planar view.

In other embodiments, the vehicle further includes a charger, and the charger is disposed between the power reception device and the battery.

In other embodiments, the vehicle further includes a charge unit connected to a power supplying connector disposed in the external, and the charger converts power supplied from the charge unit to charging power for the battery, and converts power received from the power reception device to the charging power for the battery.

In other embodiments, the vehicle further includes a charge control unit and the charge control unit is disposed between the power reception device and the battery.

In other embodiments, a rear end of the power reception device is disposed to protrude to a rear side of the vehicle further than a rear end of the battery.

In other embodiments, the power transmission device includes a power transmission unit configured to transmit power in a non-contact manner to the power reception device, the power reception device includes a power reception unit configured to receive power in a non-contact manner from the power transmission unit, and a difference between the natural frequency of the power transmission unit and the natural frequency of the power reception unit is 10% of the natural frequency of the power reception unit or less.

In other embodiments, the power transmission device includes a power transmission unit configured to transmit power in a non-contact manner to the power reception device, the power reception device includes a power reception unit configured to receive power in a non-contact manner from the power transmission unit, and a coupling coefficient between the power reception unit and the power transmission unit is 0.1 or less.

In other embodiments, the power transmission device includes a power transmission unit configured to transmit power in a non-contact manner to the power reception device, the power reception device includes a power reception unit configured to receive power in a non-contact manner from the power transmission unit, and the power reception unit receives the power from the power transmission unit through at least one of a magnetic field which is formed between the power reception unit and the power transmission unit and oscillates at a specific frequency, and an electric field which is formed between the power reception unit and the power transmission unit and oscillates at a specific frequency.

A power transfer system according to the present invention includes a power transmission device configured to transmit power in a non-contact manner, and a vehicle including a floor panel, a power reception device configured to receive power from the power transmission device, and a battery connected to the power reception device. The battery is disposed above the floor panel, the power reception device is disposed below the floor panel, and the power reception device and the battery are disposed to overlap each other at least partially in planar view.

In other embodiments, the vehicle further includes a charger, and the charger is disposed between the power reception device and the battery.

In other embodiments, the vehicle further includes a charge unit connected to a power supplying connector disposed in the external, and the charger converts power supplied from the charge unit to charging power for the battery, and converts power received from the power reception device to the charging power for the battery.

In other embodiments, the vehicle further includes a charge control unit and the charge control unit is disposed between the power reception device and the battery.

In other embodiments, a rear end of the power reception device is disposed to protrude to a rear side of the vehicle further than a rear end of the battery.

Advantageous Effects of Invention

According to the present invention, it is possible to provide a vehicle and a power transfer system having a structure which allows a power reception device to be efficiently mounted in a limited space of the vehicle.

DESCRIPTION OF EMBODIMENTS

Figure 1:
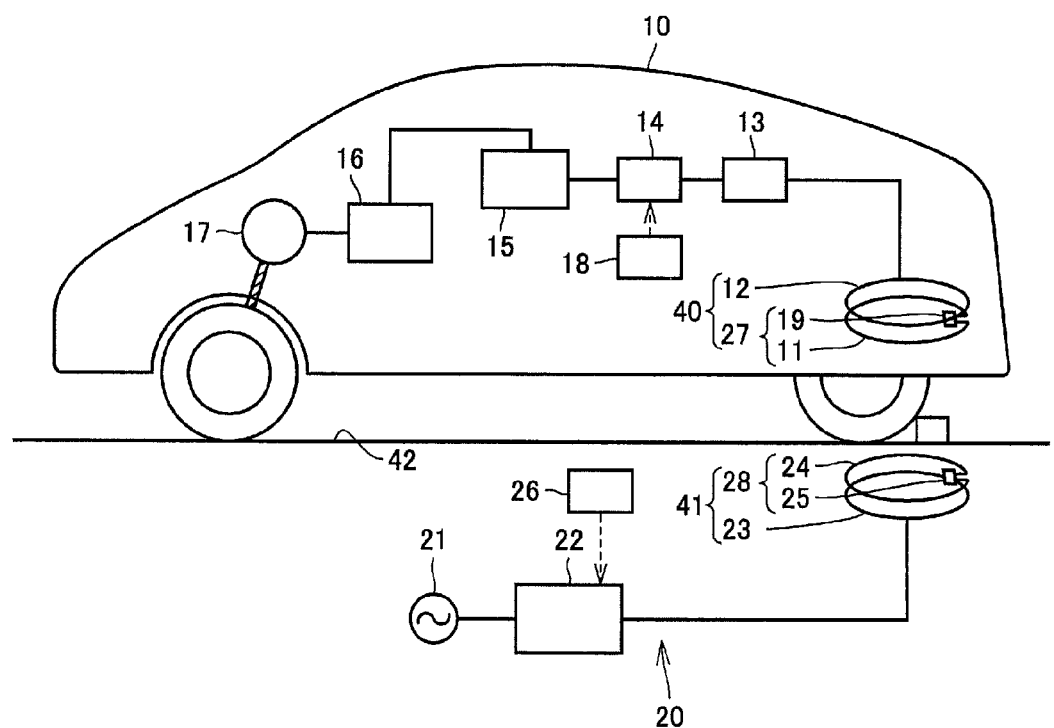
FIG. 1 is a view schematically illustrating a power transmission device, a power reception device and a power transfer system mounted in a vehicle according to Embodiment 1 of the present invention.

Hereinafter, a power transmission device, a power reception device and a power transfer system mounted in a vehicle according to an embodiment of the present invention will be described with reference to the drawings. It should be noted that the scope of the present invention is not necessarily limited to the numbers, the amounts and the like which are mentioned in each embodiment to be described below unless otherwise specified. In the following descriptions, the same or equivalent portions in the drawings will be given the same reference marks and the description thereof may not be repeated. Further, an appropriate combination of the configurations in each of embodiments is intended to be included in the present invention from the beginning.

(Embodiment 1)

A vehicle mounted with a power transfer system according to the present embodiment will be described with reference to FIG. 1. FIG. 1 is a view schematically illustrating a power transmission device, a power reception device and a power transfer system mounted in the vehicle according to the present embodiment.

The power transfer system according to Embodiment 1 includes an electrically powered vehicle 10 equipped with a power reception device 40, and an external power supply device 20 equipped with a power transmission device 41. When electrically powered vehicle 10 is parked in a parking space 42 at a predetermined location where power transmission device 41 is disposed, and power reception device 40 receives power mainly from power transmission device 41.

In order to make electrically powered vehicle 10 stop at the predetermined location, a chock block or a chock line is disposed in parking space 42.

External power supply device 20 includes a high-frequency power driver 22 connected to an AC power supply 21, a controller 26 for controlling the operation of high-frequency power driver 22 and the like, and power transmission device 41 connected to high-frequency power driver 22. Power transmission device 41 includes a power transmission unit 28 and an electromagnetic induction coil 23. Power transmission unit 28 includes a resonant coil 24, and a capacitor 25 connected to resonant coil 24. Electromagnetic induction coil 23 is electrically connected to high-frequency power driver 22. It should be noted that although capacitor 25 is provided in the example illustrated in FIG. 1, capacitor 25 is not an essential component.

Power transmission unit 28 includes an electric circuit formed from an inductance of resonant coil 24, a stray capacitance of resonant coil 24, and a capacitance of capacitor 25.

Electrically powered vehicle 10 is equipped with power reception device 40, a rectifier 13 connected to power reception device 40, a DC/DC converter 14 connected to rectifier 13, a battery 15 connected to DC/DC converter 14, a PCU (power control unit) 16, a motor unit 17 connected to power control unit 16, and a vehicular ECU (Electronic Control Unit) 18 configured to control the operations of DC/DC converter 14, power control unit 16 and the like. It should be noted that although electrically powered vehicle 10 according to the present embodiment is described as a hybrid vehicle equipped with an engine (not shown), the vehicle may be a fuel cell vehicle or an electric vehicle if it is driven by a motor.

Rectifier 13 is connected to electromagnetic induction coil 12, and is configured to convert an AC current supplied from electromagnetic induction coil 12 into a DC current and supply it to DC/DC converter 14.

DC/DC converter 14 adjusts the voltage of the DC current received from rectifier 13 and supplies it to battery 15. It should be noted that DC/DC converter 14 is not an essential component and may not be disposed. In this case, a matching unit for matching the impedance in external power supply device 20 may be disposed between power transmission device 41 and high-frequency power driver 22 to replace DC/DC converter 14.

Power control unit 16 includes a converter connected to battery 15 and an inverter connected to the converter. The converter adjusts (boosts) the DC current supplied from battery 15 and supplies it to the inverter. The inverter converts the DC current supplied from the converter to an AC current and supplies it to motor unit 17.

Motor unit 17 is adopted from a three-phase AC motor or the like, for example, and is driven by the AC current supplied from the inverter of power control unit 16.

In the case where electrically powered vehicle 10 is a hybrid vehicle, electrically powered vehicle 10 is further provided with an engine. Motor unit 17 includes a motor generator which primarily functions as a generator and a motor generator which primarily functions as a motor.

Power reception device 40 includes a power reception unit 27 and an electromagnetic induction coil 12. Power reception unit 27 includes a resonant coil 11 and a capacitor 19. Resonant coil 11 has a stray capacitance. Therefore, power reception unit 27 contains an electric circuit formed from the inductance of resonant coil 11, and the capacitance of resonant coil 11 and capacitor 19. It should be noted that capacitor 19 is not an essential component and may not be disposed.

In the power transfer system according to the present embodiment, the difference between the natural frequency of power transmission unit 28 and the natural frequency of power reception unit 27 is not greater than 10% of the natural frequency of power reception unit 27 or power transmission unit 28. By setting the natural frequencies of power reception unit 27 and power transmission unit 28 in the above range, it is possible to improve the power transfer efficiency. On the other hand, if the natural frequency difference is greater than 10% of the natural frequency of power reception unit 27 or power transmission unit 28, the power transfer efficiency will become less than 10%, which causes such problems as making the charging time of battery 15 longer or the like.

In the case where capacitor 25 is not disposed, the natural frequency of power transmission unit 28 refers to an oscillation frequency at which the electric circuit, which is formed from the inductance of resonant coil 24 and the capacitance of resonant coil 24, oscillates freely. In the case where capacitor 25 is disposed, the natural frequency of power transmission unit 28 refers to an oscillation frequency at which the electric circuit, which is formed from the capacitance of capacitor 25 and resonant coil 24 and the inductance of resonant coil 24, oscillates freely. In the above electric circuit, the natural frequency at which a braking force and an electrical resistance are zero or substantially zero is referred to as the resonance frequency of power transmission unit 28.

Similarly, in the case where capacitor 19 is not disposed, the natural frequency of power reception unit 27 refers to an oscillation frequency at which the electric circuit, which is formed from the inductance of resonant coil 11 and the capacitance of resonant coil 11, oscillates freely. In the case where capacitor 19 is disposed, the natural frequency of power reception unit 27 refers to an oscillation frequency at which the electric circuit, which is formed from the capacitance of capacitor 19 and resonant coil 11 and the inductance of resonant coil 11, oscillates freely. In the above electric circuit, the natural frequency at which a braking force and an electrical resistance are zero or substantially zero is referred to as the resonance frequency of power reception unit 27.

Figure 2:
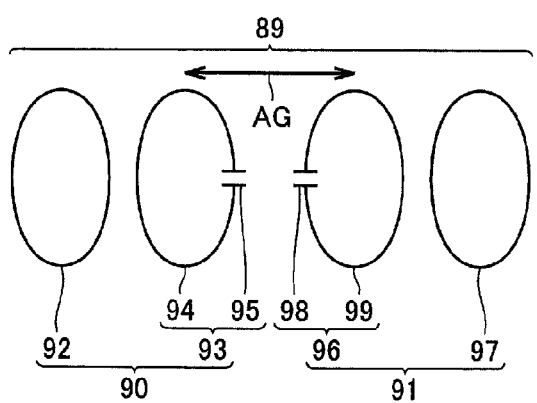
FIG. 2 is a view illustrating a simulation model of the power transfer system.
Figure 3:
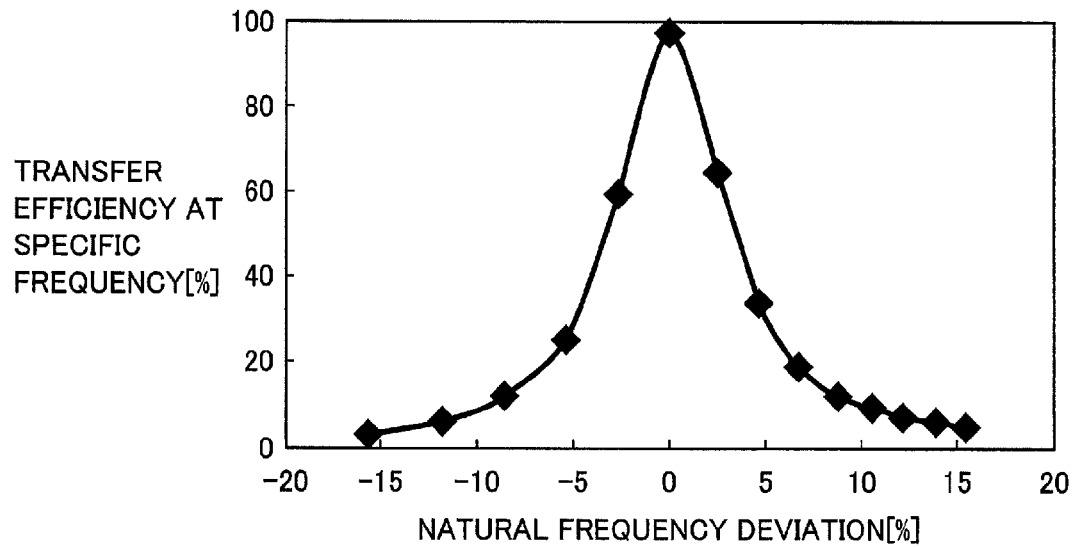
FIG. 3 is a graph illustrating a simulation result.

With reference to FIGS. 2 and 3, a simulation result analyzing the relationship between the power transfer efficiency and the natural frequency difference will be described. FIG. 2 illustrates a simulation model of a power transfer system. A power transfer system 89 is provided with a power transmission device 90 and a power reception device 91. Power transmission device 90 includes an electromagnetic induction coil 92 and a power transmission unit 93. Power transmission unit 93 includes a resonant coil 94 and a capacitor 95 disposed in resonant coil 94.

Power reception device 91 is provided with a power reception unit 96 and an electromagnetic induction coil 97. Power reception unit 96 includes a resonant coil 99 and a capacitor 98 connected to resonant coils 99.

The inductance of the resonant coil 94 is set as inductance Lt, and the capacitance of capacitor 95 is set as capacitance C1. The inductance of the resonant coil 99 is set as inductance Lr, and the capacitance of capacitor 98 is set as capacitance C2. By setting each parameter in this way, the natural frequency f1 of power transmission unit 93 is represented by the following expression (1), and the natural frequency f2 of power reception unit 96 is represented by the following expression (2).

$$f1 = 1/\{2\pi(Lt \times C1)^{1/2}\} \quad (1)$$

$$f2 = 1/\{2\pi(Lr \times C2)^{1/2}\} \quad (2)$$

In the case where inductance Lr and capacitances C1 and C2 are fixed and only inductance Lt is being varied, the relationship between the power transfer efficiency and the deviation of the natural frequencies between power transmission unit 93 and power reception unit 96 is illustrated in FIG. 3. Note that in the simulation, the relative positional relationship between resonant coil 94 and the resonant coil 99 is fixed, and the frequency of the current supplied to power transmission unit 93 is constant.

In the graph illustrated in FIG. 3, the horizontal axis represents the natural frequency deviation (%), and the vertical axis represents the transfer efficiency (%) at a specific frequency. The natural frequency deviation (%) is represented by the following expression (3).

$$\text{(the natural frequency deviation)} = \{(f1-f2)/f2\} \times 100 \text{ (\%)} \quad (3)$$

It is obvious from FIG. 3 that the power transfer efficiency is 100% when the natural frequency deviation (%) is ±0%, the power transfer efficiency is 40% when the natural frequency deviation (%) is ±5%, the power transfer efficiency is 10% when the natural frequency deviation (%) is ±10%, and the power transfer efficiency is 5% when the natural frequency deviation (%) is ±15%. In other words, it can been seen that it is possible to improve the power transfer efficiency by setting the respective natural frequency of the power transmission unit and the power reception unit so that the absolute value of the natural frequency deviation (%) (the difference between the natural frequencies) is in the range of not more than 10% of the natural frequency of power reception unit 96. Moreover, it can been seen that it is possible to improve the power transfer efficiency by setting the respective natural frequency of the power transmission unit and the power reception unit so that the absolute value of the natural frequency deviation (%) is in the range of not more than 5% of the natural frequency of power reception unit 96. In the present embodiment, the electromagnetic field analysis software (JMAG (registered trademark) manufactured by JSOL Corporation Ltd.) is used as the simulation software.

Hereinafter, the operations of the power transfer system according to the present embodiment will be described. In FIG. 1, an AC power is supplied from high-frequency power driver 22 to electromagnetic induction coil 23. As a predetermined AC current flows through electromagnetic induction coil 23, an AC current will be generated through electromagnetic induction to flow through resonant coil 24. At this time, the power is supplied to electromagnetic induction coil 23 so that the AC current flowing through resonant coil 24 has a specific frequency.

As the current of the specific frequency flows through resonant coil 24, an electromagnetic field is formed around resonant coil 24, oscillating at the specific frequency.

Resonant coil 11 is disposed within a predetermined distance from resonant coil 24, and resonant coil 11 is configured to receive power via the electromagnetic field formed around resonant coil 24.

In the present embodiment, a so-called helical coil is used as resonant coil 24 and resonant coil 11. Therefore, a magnetic field oscillating at the specific frequency is primarily formed around resonant coil 24, and resonant coil 11 receives power via the magnetic field.

Hereinafter, the magnetic field of the specific frequency formed around resonant coil 24 will be described. Typically, in "the magnetic field of the specific frequency", the power transfer efficiency is associated with the frequency of the current supplied to resonant coil 24. First, the relationship between the power transfer efficiency and the frequency of the current supplied to resonant coil 24 will be explained. The power transfer efficiency in transferring power from resonant coil 24 to resonant coil 11 varies according to various factors such as the distance between resonant coil 24 and resonant coil 11. For example, the natural frequency (resonance frequency) of power reception unit 27 and power transmission unit 28 is set as natural frequency f0, the frequency of the current supplied to resonant coil 24 is set as frequency f3, and an air gap between resonant coil 11 and resonant coil 24 is set as an air gap AG.

Figure 4:
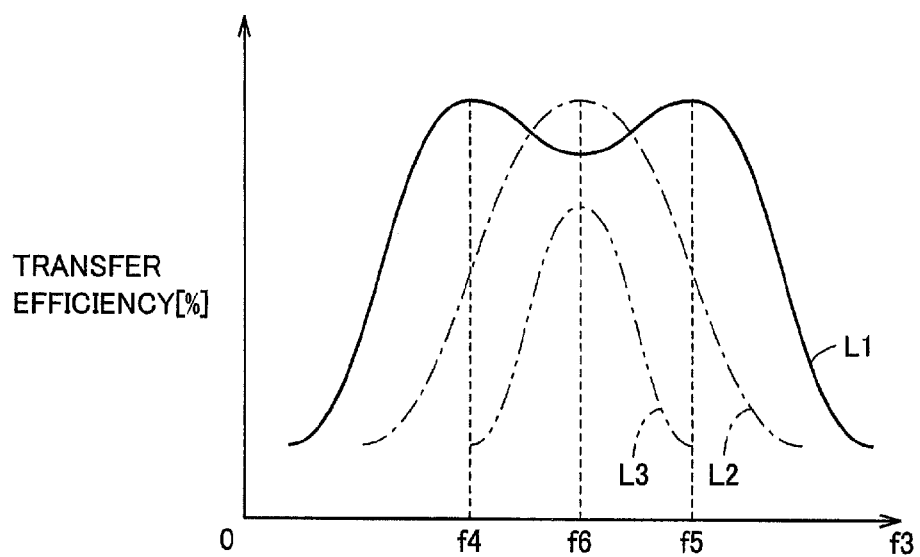
FIG. 4 is a graph illustrating a relationship between a power transfer efficiency obtained by varying an air gap while fixing the natural frequency and a frequency f of a current supplied to a resonant coil.

FIG. 4 is a graph illustrating the relationship between the power transfer efficiency obtained by varying air gap AG with natural frequency f0 fixed and frequency f3 of the current supplied to resonant coil 24.

In the graph illustrated in FIG. 4, the horizontal axis represents frequency f3 of the current supplied to resonant coil 24, and the vertical axis represents the power transfer efficiency (%). Efficiency curve L1 schematically illustrates the relationship between the power transfer efficiency when air gap AG is small and frequency f3 of the current which is supplied to resonant coil 24, As illustrated by efficiency curve L1, when air gap AG is small, the peaks of the power transfer efficiency appear at frequencies f4 and f5 (f4<f5), respectively. As air gap AG increases, two peaks where the power transfer efficiency is great begin to approach each other. As illustrated by efficiency curve L2, as air gap AG becomes greater than a predetermined distance, the power transfer efficiency has only one peak, i.e., the power transfer efficiency peaks at frequency f6 which is the frequency of the current supplied to resonant coil 24. As air gap AG becomes further greater than that for efficiency curve L2, as illustrated by efficiency curve 3, the peak of the power transfer efficiency decreases.

As an approach to improve the power transfer efficiency, for example, a first approach to be described in the following may be given. According to the first approach, the characteristics of the power transfer efficiency between power reception unit 27 and power transmission unit 28 may be varied by varying the capacitance of capacitor 19 and capacitor 25 in accordance with air gap AG while keeping constant the frequency of the current to be supplied to resonant coil 24 illustrated in FIG. 1. Specifically, when the frequency of the current to be supplied to resonant coil 24 is kept constant, the capacitance of capacitor 19 and capacitor 25 is adjusted to peak the power transfer efficiency. In this approach, the frequency of the current flowing through resonant coil 11 and resonant coil 24 is kept constant irrespective of the size of air gap AG. As an approach of varying the characteristics of the power transfer efficiency, for example, it is also possible to use a matching unit disposed between power transmission device 41 and high-frequency power driver 22 or to use converter 14.

As a second approach, the frequency of the current to be supplied to resonant coil 24 is adjusted on the basis of the size of air gap AG. For example, in the case where the power transfer efficiency is characterized by efficiency curve L1 illustrated in FIG. 4, a current of frequency f4 or f5 is supplied to resonant coil 24. Moreover, in the case where the power transfer efficiency is characterized by efficiency curve L2 or L3, a current of frequency f6 is supplied to resonant coil 24. In this approach, the frequency of the current flowing through resonant coil 11 and resonant coil 24 is varied in accordance with the size of air gap AG.

In the first approach, the frequency of the current flowing through resonant coil 24 is fixed at a constant frequency, while in the second approach, the frequency of the current flowing through resonant coil 24 is varied appropriately according to air gap AG. According to the first approach or the second approach, the current which is set to the specific frequency for the purpose of improving the power transfer efficiency is supplied to resonant coil 24. As the current of the specific frequency flows through resonant coil 24, a magnetic field (electromagnetic field) which oscillates at the specific frequency is formed around resonant coil 24. Power reception unit 27 receives power from power transmission unit 28 via the magnetic field which is formed between power reception unit 27 and power transmission unit 28 and oscillates at the specific frequency. Thus, the "magnetic field which oscillates at the specific frequency" is not necessarily limited to a magnetic field having a fixed frequency. Moreover, in the above example, although it is described that the frequency of the current to be supplied to resonant coil 24 is set focusing on air gap AG, since the power transfer efficiency may vary according to the other factors, the frequency of the current to supplied to resonant coil 24 may be adjusted on the basis of the other factors.

As an example described in the present embodiment, a helical coil is used as the resonant coil. However, in the case where an antenna such as a meander line antenna is used as the resonant coil, as a current of the specific frequency flows through resonant coil 24, an electric field of a specific frequency is formed around resonant coil 24, and the power is transferred between power transmission unit 28 and power reception unit 27 via the electric field.

Figure 5:
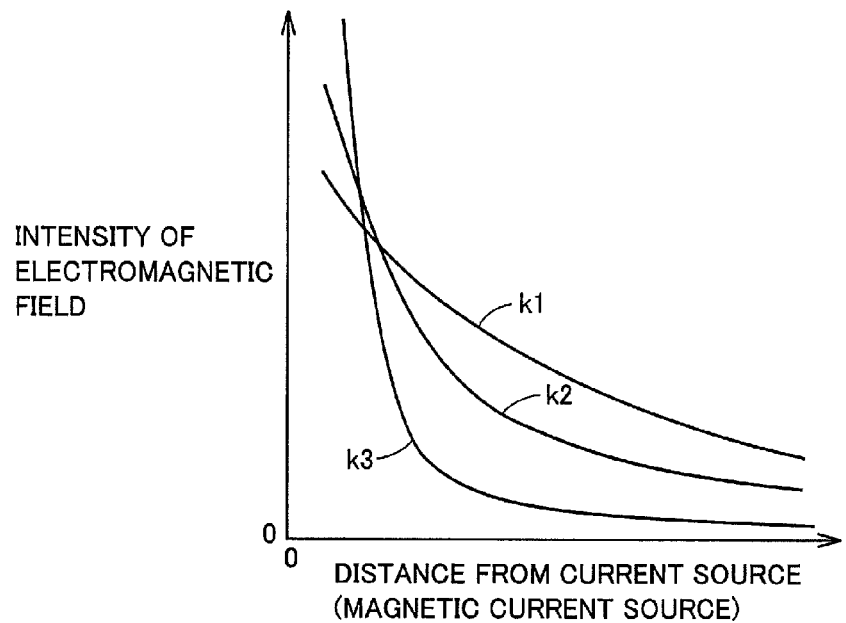
FIG. 5 is a diagram illustrating a relationship between a distance from a current source (magnetic current source) and an intensity of an electromagnetic field.

In the power transfer system according to the present embodiment, the improvement on the power transmission efficiency and the power reception efficiency is achieved by utilizing a near field where an "electrostatic field" in the electromagnetic field is dominant (evanescent field). FIG. 5 is a diagram illustrating the relationship between the intensity of the electromagnetic field and the distance from the current source (magnetic current source). With reference to FIG. 5, the electromagnetic field consists of three components. Curve k1 is a component inversely proportional to the distance from the wave source, and is referred to as a "radiation field". Curve k2 is a component inversely proportional to the square of the distance from the wave source, and is referred to as an "induction field". Curve k3 is a component inversely proportional to the cube of the distance from the wave source, and is referred to as an "electrostatic field". If the wavelength of the electromagnetic field is set as "λ", then, the distance where the intensity of the "radiation field" and the intensity of the "induction field" and the intensity of the "electrostatic field" are approximately equal to each other can be denoted by $\lambda/2\pi$.

The "electrostatic field" is a region where the intensity of the electromagnetic wave decreases rapidly with the increase of distance from the wave source, and in the power transfer system according to the present embodiment, the transfer of energy (power) is conducted by utilizing a near field where the "electrostatic field" is dominant (evanescent field). In other words, the energy (power) is transferred from power transmission unit 28 to power reception unit 27 on the other side through resonating power transmission unit 28 and power reception unit 27 (for example, a pair of LC resonant coils) having the same natural frequency in a near field with dominant "electrostatic field". Since the "electrostatic field" does not propagate energy far away, compared to an electromagnetic wave which transfers energy (power) by propagating energy far away via the "radiation field", the resonance method can transmit power with less energy loss.

As mentioned, in the power transfer system according to the present embodiment, power is transmitted from power transmission device 41 to the power reception device by the way of resonating power reception unit 27 and power transmission unit 28 via an electromagnetic field. Preferably, the coupling coefficient (κ) between power transmission unit 28 and power reception unit 27 is 0.1 or less. It should be noted that the coupling coefficient (κ) is not limited to the above value and may take various kinds of values as long as a perfect power transfer is allowed. Generally, in transferring power by utilizing the electromagnetic induction, the coupling coefficient (κ) between the power transmission unit and the power reception unit is close to 1.0.

In the power transfer according to the present embodiment, the coupling between power transmission unit 28 and power reception unit 27 refers to, for example, "magnetic resonance coupling", "magnetic field resonance coupling", "electromagnetic field resonance coupling" or "electric field resonance coupling".

"Electric field resonance coupling" includes any of "magnetic resonance coupling", "magnetic field resonance coupling" and "electric field resonance coupling", Since the antenna of a coil shape is used as resonant coil 11 of power reception unit 27 and resonant coil 24 of power transmission unit 28 described in the specification, power reception unit 27 and transmission unit 28 are mainly coupled via the magnetic field, and the coupling between power reception unit 27 and power transmission section 28 is "magnetic resonance coupling" or "magnetic field resonance coupling".

However, it is also possible to use an antenna such as a meander line antenna as resonant coils 11 and 24. In this case, power reception unit 27 and power transmission unit 28 are mainly coupled via an electric field, and the coupling between power reception unit 27 and power transmission section 28 is "electric field resonance coupling".

(Power Reception Device 40)

Figure 6:
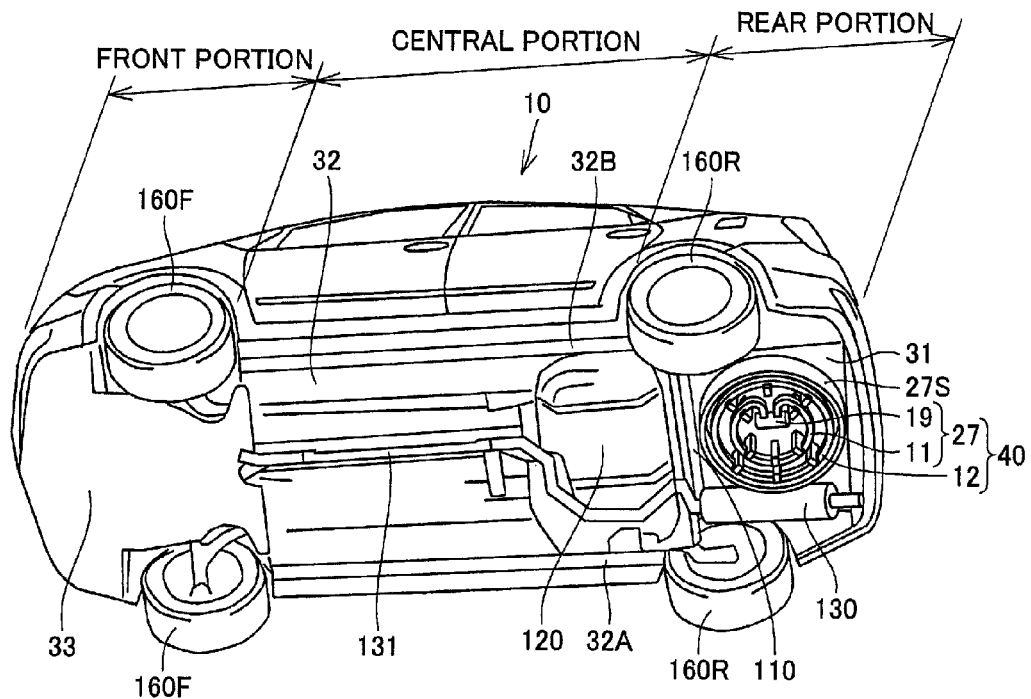
FIG. 6 is a bottom view of the vehicle according to Embodiment 1 for illustrating the arrangement of the power reception device mounted in the vehicle.

The detailed configuration of power reception device 40 according to Embodiment 1 will be described with reference to FIGS. 6 to 8. FIG. 6 is a bottom view of electrically powered vehicle 10 according to Embodiment 1 for illustrating the arrangement of the power reception device mounted in the vehicle, FIG. 7 is a partial and transverse cross sectional view (in the lateral direction) illustrating the arrangement of the power reception device mounted in electrically powered vehicle 10 according to Embodiment 1, and FIG. 8 is a partial and vertical cross sectional view (in the anteroposterior direction) illustrating the arrangement of the power reception device mounted in electrically powered vehicle 10 according to Embodiment 1.

As illustrated in FIG. 6, a region from a front end of electrically powered vehicle 10 to a rear end of a front wheel tire 160F is referred to as a front portion, a region from the rear end of front wheel tire 160F to a front end of a rear wheel tire 160R is referred to as a central portion, and a region from the front end of rear wheel tire 160R to a rear end of electrically powered vehicle 10 is referred as a rear portion. The same applies in the following description. As illustrated in FIG. 7, when electrically powered vehicle 10 is placed on a horizontal surface, the side oriented upward in the vertical direction is referred to as the upper side and the side oriented downward in the vertical direction is referred to as the lower side; when facing to the front side of the vehicle, the side to the left hand is referred to as the left side and the side to the right hand is referred to as the right side. The same applies in the following description.

With reference to FIG. 6, electrically powered vehicle 10 of the present embodiment includes a rear floor panel 31, a muffler 130 and a pair of laterally disposed rear wheel tires 160R which are disposed in the rear portion, center floor panel 32, a fuel tank 120 and side members 32A and 32B which are disposed in the central portion, an engine floor panel 33 and a pair of laterally disposed front wheel tires 160F which are disposed in the front portion.

Figure 7:
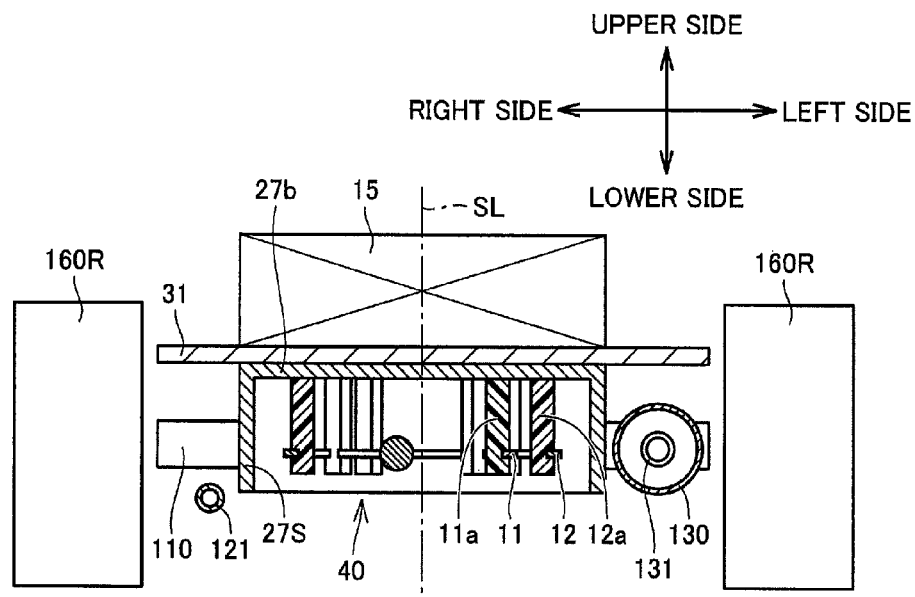
FIG. 7 is a partial and transverse cross sectional view (in the lateral direction) illustrating the arrangement of the power reception device mounted in the vehicle according to Embodiment 1.
Figure 8:
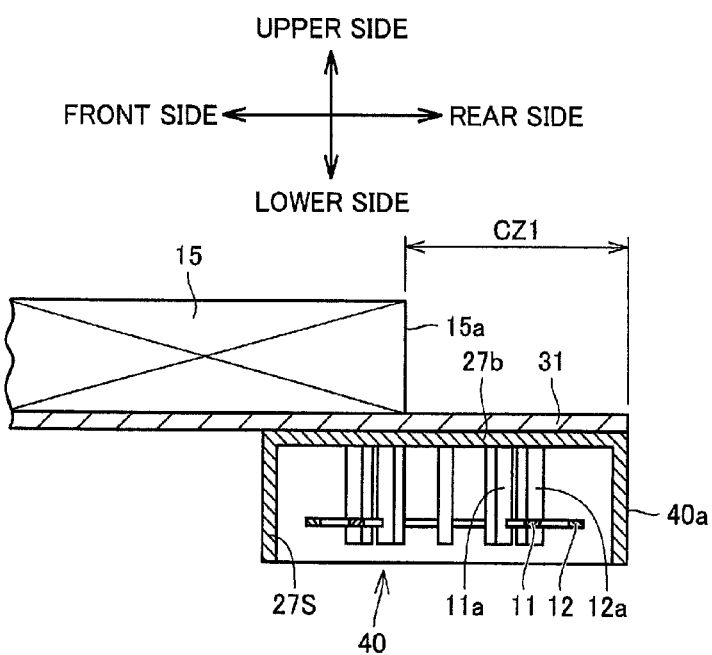
FIG. 8 is a partial and vertical cross sectional view (in the anteroposterior direction) illustrating the arrangement of the power reception device mounted in the vehicle according to Embodiment 1.

With reference to FIG. 6, battery 15 is disposed above the floor panel, namely rear floor panel 31 in the rear portion of electrically powered vehicle 10 (see FIG. 7). Power reception device 40 is disposed below battery 15, sandwiching rear floor panel 31 therebetween. In the present embodiment, approximately a half part of power reception device 40 to the front side is located between the pair of rear wheel tires 160R, and approximately the other half part of power reception device 40 to the rear side projects toward the rear side from the pair of rear wheel tires 160R. It should be noted that the positional arrangement of power reception device 40 relative to rear wheel tires 160R is not limited to the present embodiment.

Power reception device 40 includes power reception unit 27 and circular electromagnetic induction coil 12. Power reception unit 27 is provided with circular coil 11 and resonance capacitor 19. In the present embodiment, a shield member 27S is provided to enclose power reception device 40. Shield member 27S has a cylindrical shape enclosing the outside of power reception device 40 in the radial direction. Shield member 27S has a bottom 27b disposed on rear floor panel 31 and opens toward power transmission unit 28. It should be noted that shield member 27S is not limited to the shape in the present embodiment.

Resonance coil 11 is fixed to bottom 27b of shield member 27S by using a support member 11a made of resin. Electromagnetic induction coil 12 is fixed to bottom portion 27b of shield member 27S by using a support member 12a made of resin.

In the present embodiment, electromagnetic induction coil 12 is located outside resonance coils 11, but the positional relationship between resonance coil 11 and electromagnetic induction coil 12 is not limited to that mentioned above. Moreover, the shape of resonance coil 11 or electromagnetic induction coil 12 is not limited to the circular shape, and it may be a polygonal shape, an octagonal shape or the like without being particularly limited.

With reference to FIGS. 7 and 8, in the rear portion of electrically powered vehicle 10, battery 15 is disposed above rear floor panel 31 and power reception device 40 is disposed below rear floor panel 31. Furthermore, power reception device 40 and battery 15 are disposed to overlap each other at least partially in planar view. Specifically, it means that in planar view (viewed from the upper side toward the lower side in the vertical direction), the projection plane of power reception device 40 overlaps the projection plane of battery 15. Since the size (dimension) of each of battery 15 and power reception device 40 in planar view may vary, the overlapping of the projection planes corresponds to a case where the projection plane of power reception device 40 is included in the projection plane of battery 15, a case where the projection plane of battery 15 is included in the projection plane of power reception device 40, or a case where the projection planes overlap each other partially.

As illustrated in FIG. 8, a rear end 40a of power reception device 40 (i.e., rear end 40a of shield member 27S) is disposed to protrude (by a distance CZ1) to the rear side of the vehicle further than a rear end 15a of battery 15.

Usually, a crushable zone is defined in the rear side of the vehicle in case that the vehicle is subjected to a collision from the behind, and battery 15 is disposed in front of the crushable zone. Therefore, when a part of power reception device 40 is disposed to protrude into the crushable zone, in case that the vehicle is subjected to a collision from the behind, power reception device 40 may function as a shock absorber so as to protect high-voltage components such as battery 15.

As mentioned in the above, in the present embodiment, at least a part of the projection plane of battery 15 is configured to overlap the projection plane of power reception device 40. Accordingly, it is possible to mount efficiently power reception device 40 in a limited space of electrically powered vehicle 10 in planar view.

Moreover, since rear floor panel 31 is located between battery 15 and power reception device 40, the heat generated by power reception device 40 can be suppressed from being transferred to battery 15 by rear floor panel 31.

Since the distance between power reception device 40 and battery 15 is short, it is possible to shorten the length of a cable disposed between power reception device 40 and battery 15. Accordingly, it is possible to improve the charging efficiency. Moreover, since battery 15 is disposed in the front of the vehicle ahead of the crushable zone, it is possible to increase the safety for the high voltage components and to prevent cable loss (such as electric leakage or short-circuit) from occurring.

(Embodiment 2)

Hereinafter, a vehicle mounted with a power transfer system according to the present embodiment will be described with reference to FIGS. 9 to 15. The vehicle of the present embodiment differs from the vehicle of Embodiment 1 described in the above in that the vehicle of the present embodiment includes a power reception device 40 which is equipped with a power reception unit 27 and is configured to receive power in a non-contact manner from a power transmission device 41 which is equipped with a power transmission unit 28 and is disposed in the external, and further includes a charge unit connected to a power supply connector disposed in the external. The same or corresponding parts as those in Embodiment 1 will be given the same reference numerals and the description thereof will not be repeated.

Figure 9:
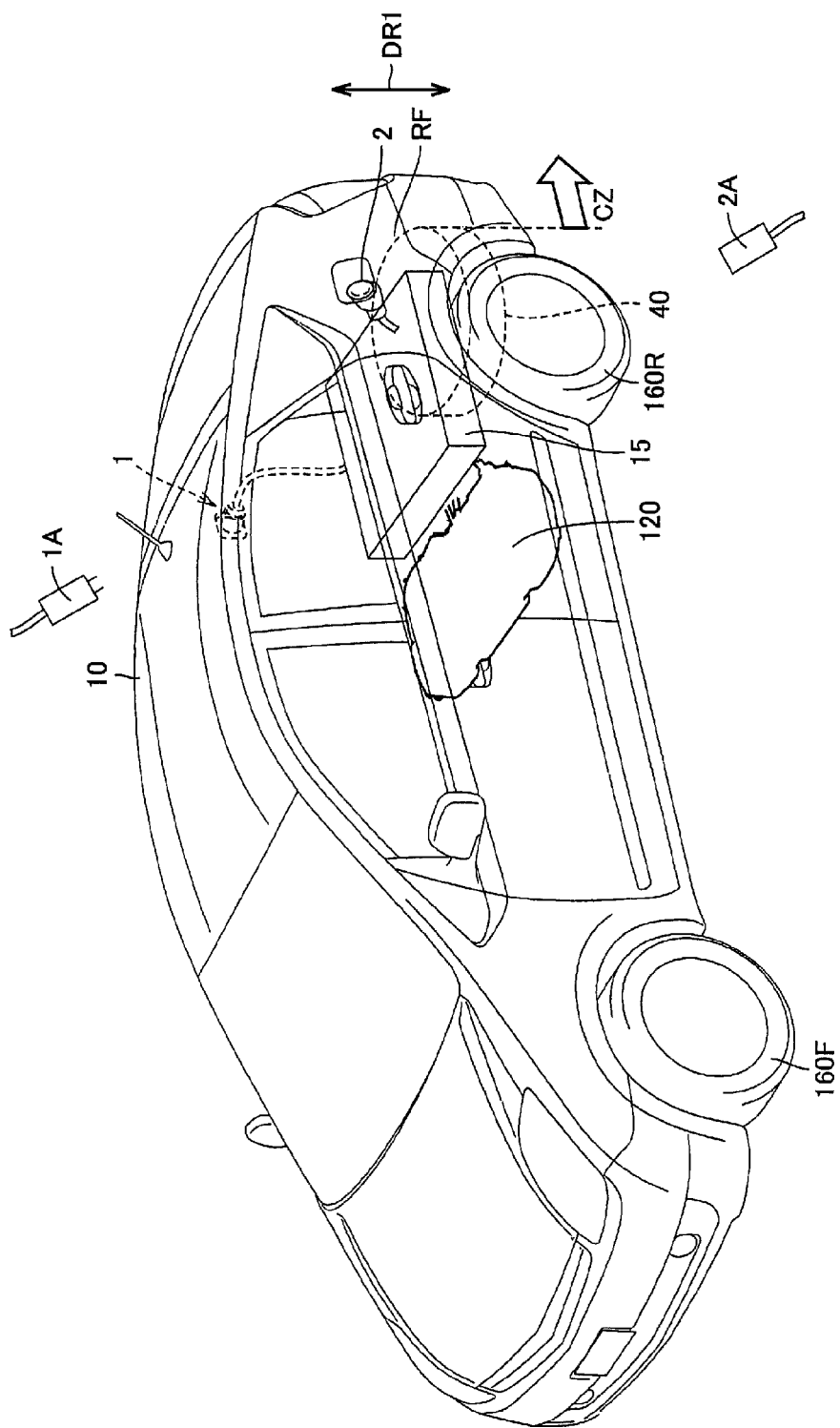
FIG. 9 is a perspective view of a vehicle according to Embodiment 2 for illustrating the arrangement of a power reception device mounted in the vehicle.
Figure 10:
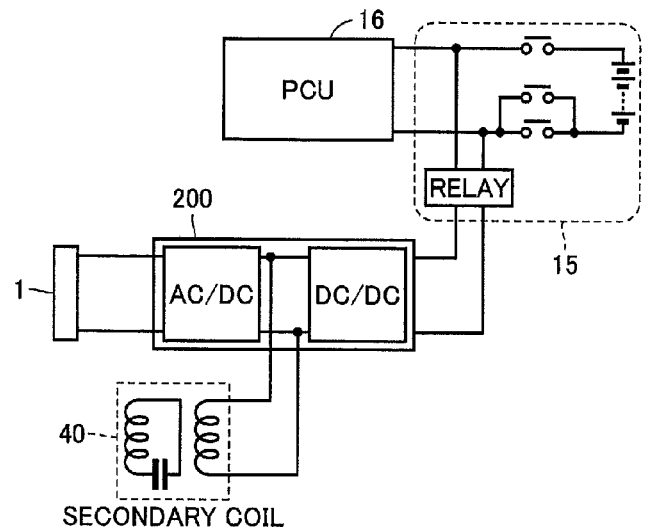
FIG. 10 is a diagram illustrating a circuit of a power reception device, a charger and a battery mounted in the vehicle according to Embodiment 2.
Figure 11:
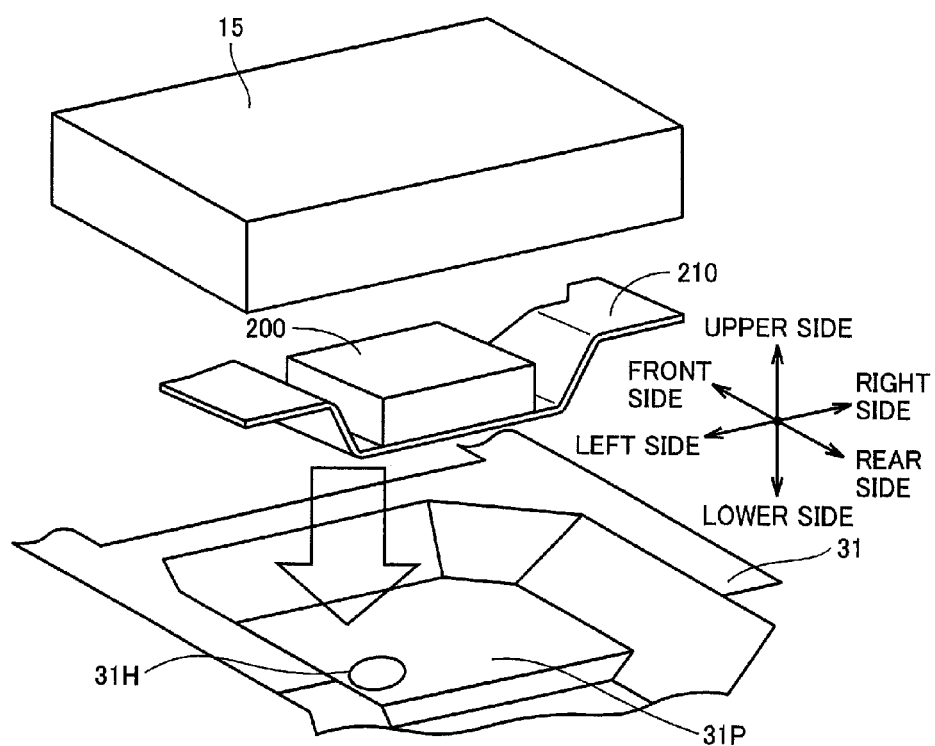
FIG. 11 is a perspective view illustrating the mounting state of the power reception device, the charger and the battery mounted in the vehicle according to Embodiment 2.
Figure 12:
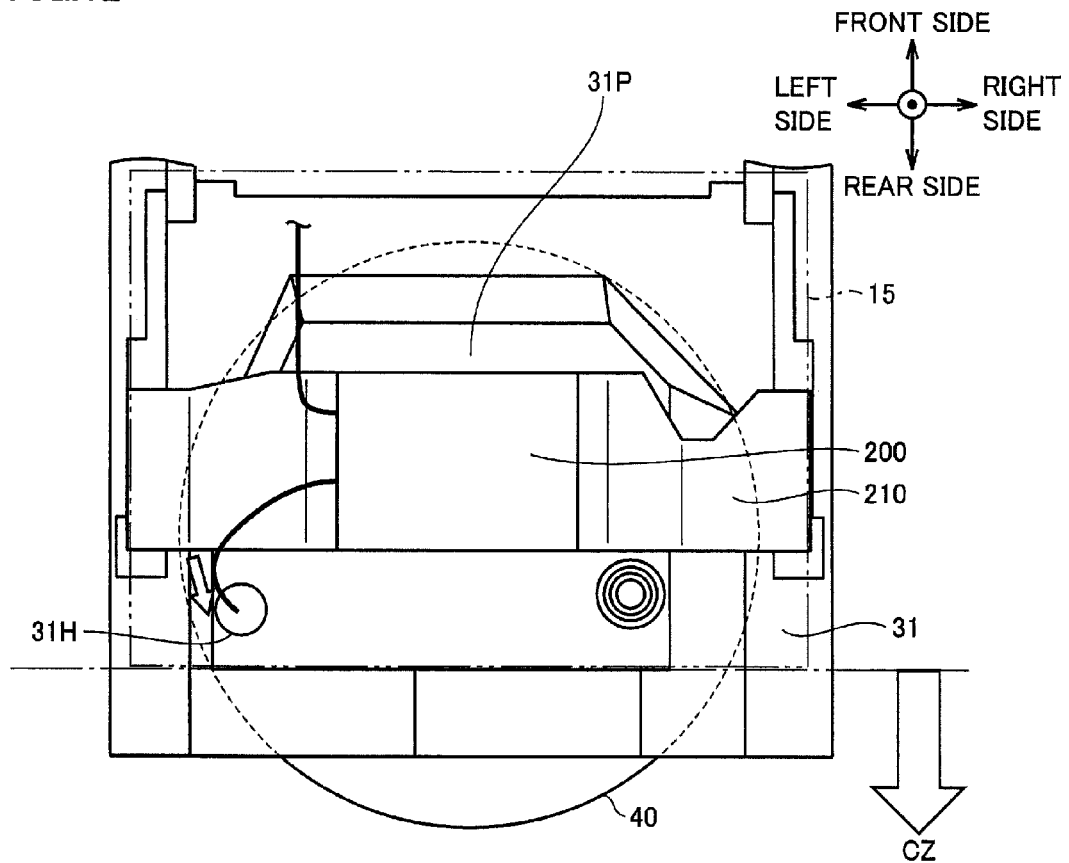
FIG. 12 is a planar view illustrating the mounting state of the power reception device, the charger and the battery mounted in the vehicle according to Embodiment 2.
Figure 13:
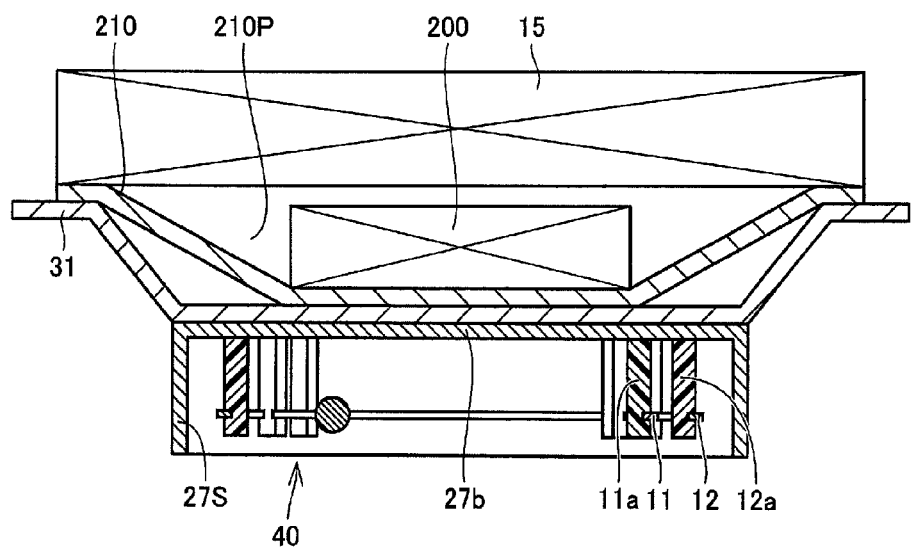
FIG. 13 is a partial and transverse cross sectional view (in the lateral direction) illustrating the mounting state of the power reception device, the charger and the battery mounted in the vehicle according to Embodiment 2.
Figure 14:
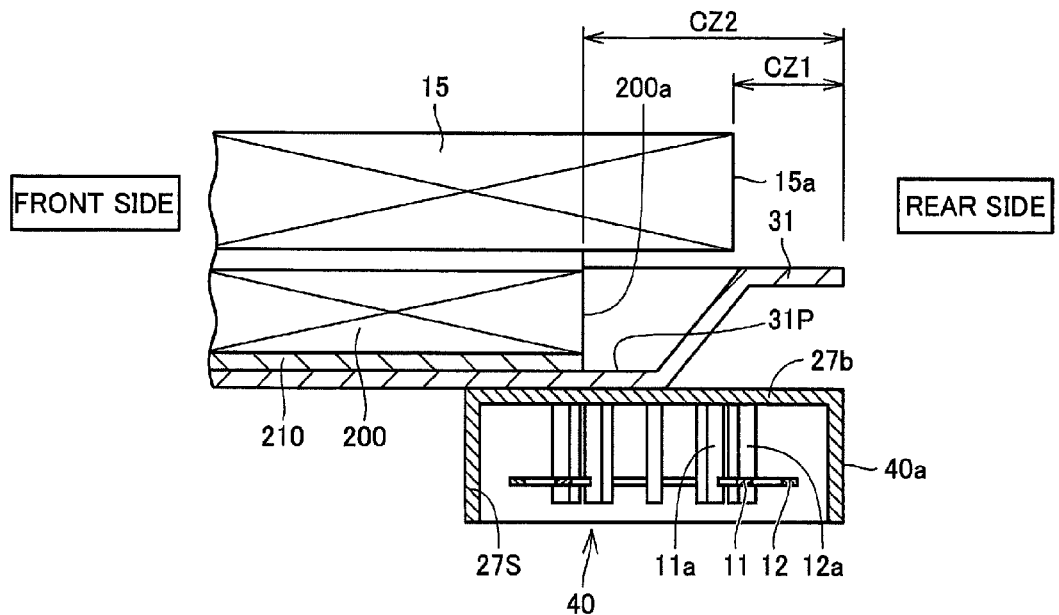
FIG. 14 is a partial and vertical cross sectional view (in the anteroposterior direction) illustrating the mounting state of the power reception device, the charger and the battery mounted in the vehicle according to Embodiment 2.
Figure 15:
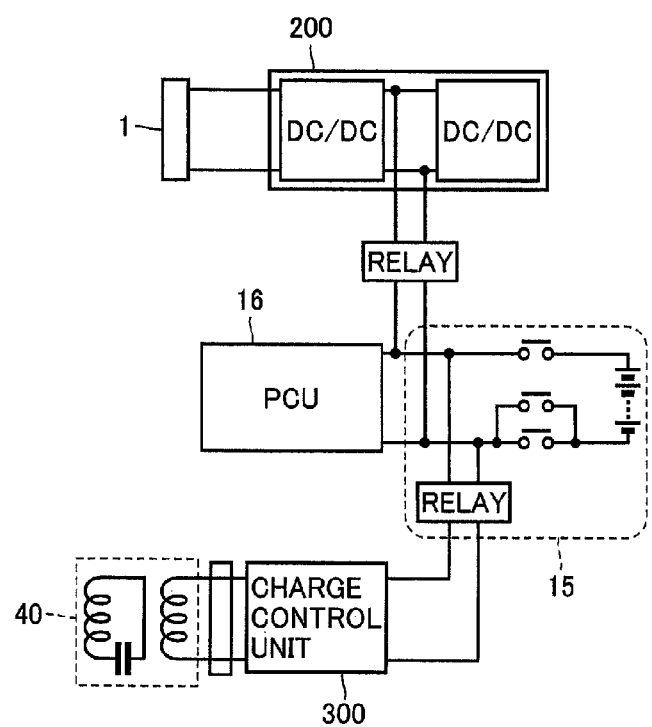
FIG. 15 is a diagram illustrating another circuit of the power reception device, the charger, a charge control unit and the battery mounted in the vehicle according to Embodiment 2.

FIG. 9 is a perspective view of electrically powered vehicle 10 according to Embodiment 2 for illustrating the arrangement of power reception device 40 mounted in the vehicle. FIG. 10 is a diagram illustrating a circuit of power reception device 40, a charger 200 and battery 15 mounted in electrically powered vehicle 10 according to Embodiment 2. FIG. 11 is a perspective view illustrating the mounting state of power reception device 40, charger 200 and battery 15 mounted in electrically powered vehicle 10 according to Embodiment 2. FIG. 12 is a planar view of the mounting state, FIG. 13 is a partial and transverse cross sectional view (in the lateral direction) of the mounting state, and FIG. 14 is a partial and vertical cross sectional view (in the antero-posterior direction) of the mounting state. FIG. 15 is a diagram illustrating another circuit.

With reference to FIG. 9, in electrically powered vehicle 10 of the present embodiment, a fuel tank 120 is disposed in a portion located under a rear seat in the passenger accommodation chamber. Battery 15 is disposed in the rear side of electrically powered vehicle 10 further than the rear seat. Similar to Embodiment 1, power reception device 40 is disposed below battery 15, sandwiching rear floor panel 31 therebetween.

Charge unit 1 is disposed on a rear fender at the left side of electrically powered vehicle 10, and a refueling unit 2 is disposed on a rear fender at the right side thereof. In the example illustrated in FIG. 9, charge unit 1 and refueling unit 2 are disposed on different sides of the vehicle; however, it is acceptable that charge unit 1 is disposed at the right side and refueling unit 2 is disposed at the left side, and it is also acceptable that both are disposed at the same side (the left side or the right side). In addition, charge unit 1 and refueling unit 2 are not necessarily to be disposed on the rear fender of the vehicle, and may be disposed on a front fender thereof.

In performing the refueling operation, a refueling connector 2A is inserted into refueling unit 2 (fuel supply unit) to obtain fuel supply. Fuel such as gasoline refueled through refueling unit 2 is stored in fuel tank 120.

In performing the charging operation, a power supplying connector 1A is inserted into charge unit 1 (power supply unit) to obtain power supply. Power supplying connector 1A receives electric power supplied from a commercial power supply (for example, single-phase AC of 100V in Japan) for charging. For example, any plug connected to a common household power supply or the like may be used as power supplying connector 1A.

With reference to FIG. 10, in the present embodiment, charger 200 is connected by charge unit 1 and power reception device 40. Charger 200 is connected by battery 15, and battery 15 is connected by a charge control unit 300. Accordingly in the present embodiment, charge unit 1 which is charged in a contact manner and power reception device 40 which receives power in a non-contact manner are connected to charger 200 in common.

Thereby, charger 200 converts the power supplied from charge unit 1 to the charging power for battery 15, and converts the power received from power reception device 40 to the charging power for battery 15. Accordingly, it is possible to reduce the number of components.

With reference to FIGS. 11 and 12, a depressed region 31P recessing to the lower side is provided in rear floor panel 31. A bracket 210 is disposed in depressed region 31P, extending in the lateral direction along the bottom surface and slant side surfaces thereof, and charger 200 is mounted on bracket 210.

With reference to FIGS. 13 and 14, in the rear portion of electrically powered vehicle 10, battery 15 is disposed above rear floor panel 31, and power reception device 40 is disposed below rear floor panel 31. Similar to Embodiment 1, power reception device 40 and battery 15 are disposed to overlap each other at least partially in planar view.

In the present embodiment, charger 200 is disposed between battery 15 and rear floor panel 31 (above rear floor panel 31), it is also acceptable that charger 200 is disposed between rear floor panel 31 and power reception device 40. Note that the lower side of power reception device 40 is the same as that in Embodiment 1.

Although in the present embodiment charger 200 is supported on bracket 210, the bracket is not essential. Although in planar view, the position of charger 200 is disposed between battery 15 and power reception device 40 in such a way that the entire part thereof is included therebetween, it is also acceptable to dispose the charger in such a way that a part thereof overlaps partially battery 15 and power reception device 40. In addition, the power lines and a power-line joint unit may be disposed between charger 200 and battery 15, or between charger 200 and bracket 210, or between charger 200 and rear floor panel 31.

As illustrated in FIG. 14, rear end 40a of power reception device 40 (i.e., rear end 40a of shield member 27S) is disposed to protrude (by distance CZ1) to the rear side of the vehicle further than rear end 15a of battery 15. Further, since a rear end 200a of charger 200 is positioned in the front side of the vehicle ahead of rear end portion 15a of the battery 15, it means that rear end 40a of power reception device 40 is disposed to protrude (by a distance CZ2) to the rear side of the vehicle further than rear end 200a of charger 200. Similar to charger 200, the same applies to charge control unit 300.

Thus, in the present embodiment, a crushable zone (region denoted by an arrow CZ in FIG. 12) is also defined in the rear side of the vehicle in case that the vehicle is subjected to a collision from the behind, and battery 15 is disposed in the front side further than the crushable zone. Therefore, when a part of power reception device 40 is disposed to protrude into the crushable zone, in case that the vehicle is subjected to a collision from the behind, power reception device 40 may function as a shock absorber so as to protect high-voltage components such as battery 15 and charger 200.

As mentioned in the present embodiment in the above, power reception device 40 is disposed below battery 15, sandwiching rear floor panel 31 therebetween, so that at least a part of the projection plane of battery 15 overlaps the projection plane of power reception device 40. Thereby, it is possible to mount efficiently power reception device 40 in a limited space of electrically powered vehicle 10 in planar view.

Moreover, since rear floor panel 31 is located between battery 15 and power reception device 40, the heat generated by power reception device 40 can be suppressed from being transferred to battery 15 by rear floor panel 31.

Since the distance between power reception device 40 and battery 15 is short, it is possible to shorten the length of cables WH1 and WH2 disposed between power reception device 40 and battery 15. Accordingly, it is possible to improve the charging efficiency. Moreover, since battery 15 is disposed in the front of the vehicle ahead of the crushable zone, it is possible to increase the safety for the high voltage components and to prevent cable loss (such as electric leakage or short-circuit) from occurring.

Figure 16:
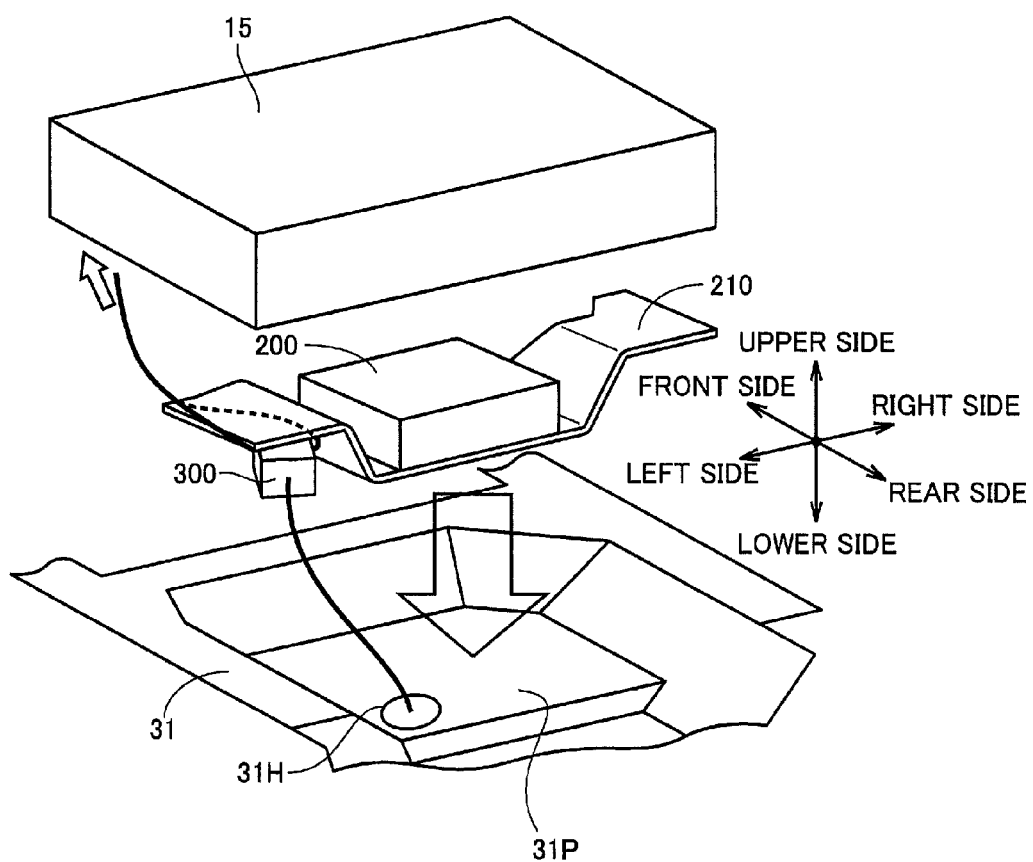
FIG. 16 is a perspective view illustrating the mounting state of the power reception device, the charger, the charge control unit and the battery mounted in the vehicle according to Embodiment 2.

As illustrated in FIG. 15, it is acceptable that charge control unit 300 is disposed on power reception device 40. In this case, as illustrated in FIG. 16, charge control unit 300 is fixed on bracket 210. One wire WH1 extending from charge control unit 300 is connected to battery 15. The other wire WH2 extending from charge control unit 300 is connected to power reception device 40, passing through a through hole 31H provided in rear floor panel 31.

Since charge control unit 300 is fixed on bracket 210, charge control unit 300 is also disposed between power reception device 40 and battery 15. It is also possible to position charge control unit 300 (below rear floor panel 31) between rear floor panel 31 and power reception device 40.

It should be noted that in each of the above embodiments, although the description has been carried out on the case where battery 15 and power reception device 40 are disposed on rear floor panel 31, the arrangement position is not limited to the rear portion of electrically powered vehicle 10.

Figure 17:
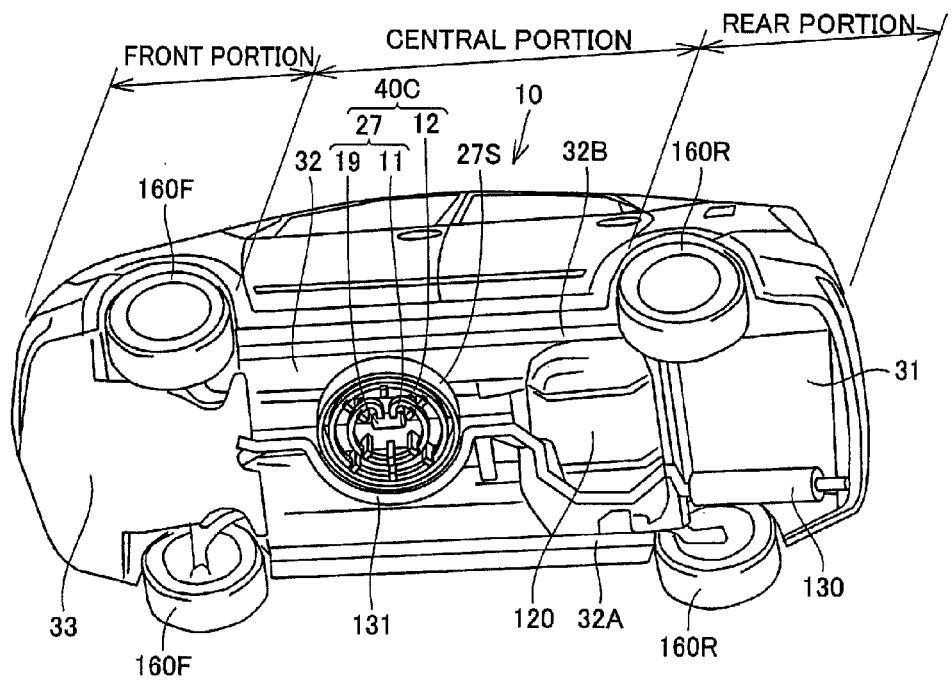
FIG. 17 is a bottom view of a vehicle according to another embodiment for illustrating the arrangement of a power reception device mounted in the vehicle.
Figure 18:
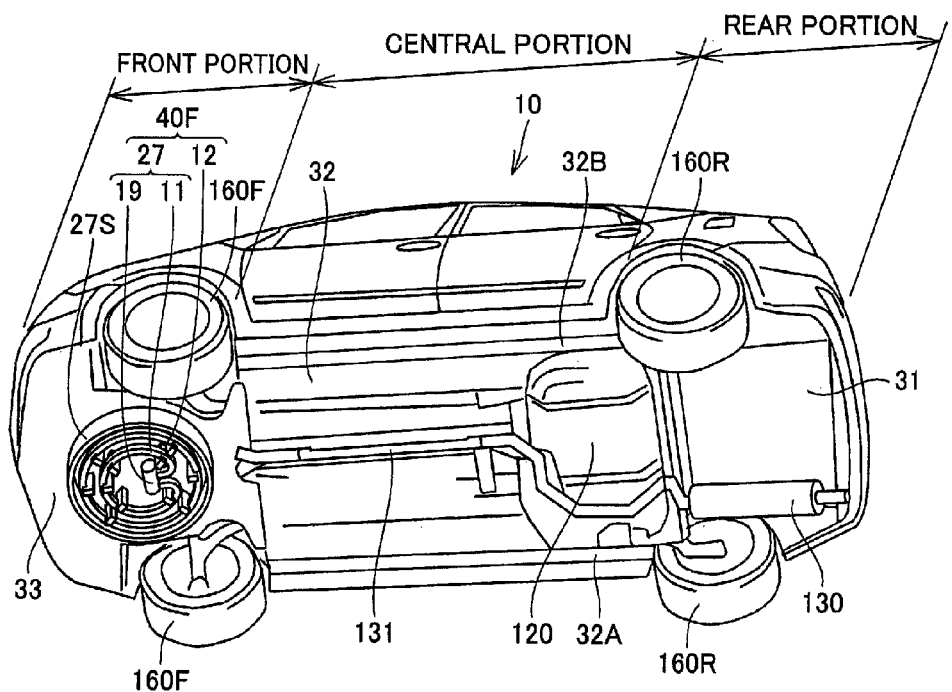
FIG. 18 is a bottom view of a vehicle according to another embodiment for illustrating the arrangement of a power reception device mounted in the vehicle.

As illustrated in FIG. 17, each of the above embodiments may be configured in such a way that battery 15 and power reception device 40 are disposed on center floor panel 32 in the central portion of electrically powered vehicle 10. Moreover, as illustrated in FIG. 18, each of the above embodiments may be configured in such a way that battery 15 and power reception device 40 are disposed on engine floor panel 33 in the front portion of electrically powered vehicle 10.

The power reception and the power transmission device described in each of the above embodiments include electromagnetic induction coil 12 and electromagnetic induction coil 23, respectively, it should be noted that the present invention is also applicable to a resonance-type non-contact power reception device which does not include an electromagnetic induction coil.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: charge unit; 1A: power supplying connector; 2: refueling unit; 2A: refueling connector; 10: electrically powered vehicle; 11, 24, 94, 99: resonance coil; 12, 23, 92, 97: electromagnetic induction coil; 11a, 12a: supporting member; 13: rectifier; 14: DC/DC converter; 15: battery; 16: power control unit; 17: motor unit; 18: vehicle ECU; 19, 25, 98, 95: capacitor; 20: external power supply device; 21: AC power supply; 22: high-frequency power driver; 26: control unit; 27, 96: power reception unit; 27S: shield member; 27b: bottom; 28, 93: power transmission unit; 29: impedance regulator; 31: rear floor panel; 31H: through hole; 32: central floor panel; 32A, 32B: side member; 33: engine floor panel; 40, 91: power reception device; 40a, 200a: rear end; 41, 90: power transmission device ; 42: parking space; 110: rear suspension; 120: fuel tank; 121: fuel hose; 130: muffler; 131: exhaust pipe; 160F: front wheel tire; 160R: rear wheel tire; 200: charger; 210: bracket; 300: charge control unit

The invention claimed is:

1. A vehicle for use with a power transmission device located externally outside the vehicle, the vehicle comprising:

a floor panel;

a power reception device configured to receive power in a non-contact manner from the power transmission device, the power reception device being disposed below the floor panel;

a battery connected to the power reception device, the battery being disposed above the floor panel, the battery and the power reception device overlapping each other at least partially in planar view, and a rear end of the power reception device protruding to a rear side of the vehicle further than a rear end of the battery;

a charger disposed between the power reception device and the battery, the floor panel being disposed between the charger and the power reception device, and a rear end of the charger being positioned in a front side of the vehicle ahead of a rear end portion of the battery; and a crushable zone disposed at the rear side of the vehicle and being configured to receive a collision from the rear side of the vehicle, wherein:

the battery and the charger are disposed in front of the crushable zone, and a part of the power reception device protrudes into the crushable zone.

2. The vehicle according to claim 1, further comprising:
a charge unit connected to a power supplying connector disposed externally outside the vehicle, wherein
the charger converts power supplied from the charge unit to charging power for the battery, and converts power received from the power reception device to the charging power for the battery.

3. The vehicle according to claim 1, further comprising:
a charge control unit, wherein
the charge control unit is disposed between the power reception device and the battery.

4. The vehicle according to claim 1, wherein:
the power transmission device includes a power transmission unit configured to transmit power in a non-contact manner to the power reception device,
the power reception device includes a power reception unit configured to receive power in a non-contact manner from the power transmission unit, and
a difference between the natural frequency of the power transmission unit and the natural frequency of the power reception unit is 10% of the natural frequency of the power reception unit or less.

5. The vehicle according to claim 1, wherein:
the power transmission device includes a power transmission unit configured to transmit power in a non-contact manner to the power reception device,
the power reception device includes a power reception unit configured to receive power in a non-contact manner from the power transmission unit, and
a coupling coefficient between the power reception unit and the power transmission unit is 0.1 or less.

6. The vehicle according to claim 1, wherein:
the power transmission device includes a power transmission unit configured to transmit power in a non-contact manner to the power reception device, the power reception device includes a power reception unit configured to receive power in a non-contact manner from the power transmission unit, and the power reception unit receives power from the power transmission unit through at least one of a magnetic field which is formed between the power reception unit and the power transmission unit and oscillates at a specific frequency, and an electric field which is formed between the power reception unit and the power transmission unit and oscillates at a specific frequency.

7. A power transfer system comprising:
a power transmission device configured to transmit power in a non-contact manner; and
a vehicle including:
a floor panel,
a power reception device configured to receive power from the power transmission device, the power reception device being disposed below the floor panel,
a battery connected to the power reception device, the battery being disposed above the floor panel, the battery and the power reception device overlapping each other at least partially in planar view, and a rear end of the power reception device protruding to a rear side of the vehicle further than a rear end of the battery,
a charger disposed between the power reception device and the battery, the floor panel being disposed between the charger and the power reception device, and a rear end of the charger being positioned in a front side of the vehicle ahead of a rear end portion of the battery; and
a crushable zone disposed at the rear side of the vehicle and being configured to receive a collision from the rear side of the vehicle, wherein:
the battery and the charger are disposed in front of the crushable zone, and
a part of the power reception device protrudes into the crushable zone.

8. The power transfer system according to claim 7, wherein:
the vehicle includes a charge unit connected to a power supplying connector disposed externally outside the vehicle, and
the charger converts power supplied from the charge unit to charging power for the battery, and converts power received from the power reception device to the charging power for the battery.

9. The power transfer system according to claim 7, wherein
the vehicle further a charge control unit, and
the charge control unit is disposed between the power reception device and the battery.

10. The vehicle according to claim 1, wherein the rear end of the power reception device protrudes into the crushable zone.

11. The power transfer system according to claim 7, wherein the rear end of the power reception device protrudes into the crushable zone.

* * * * *